(12) United States Patent
Styles et al.

(10) Patent No.: US 7,743,756 B2
(45) Date of Patent: Jun. 29, 2010

(54) AIR INLET SYSTEM FOR AN INTERNAL COMBUSTION ENGINE

(75) Inventors: Daniel Joseph Styles, Canton, MI (US); Anthony William Hudson, Highland, MI (US); Ivan Lazich, Skokie, IL (US); David Currie, New Hudson, MI (US)

(73) Assignee: Ford Global Technologies, Dearborn, MI (US)

( * ) Notice: Subject to any disclaimer, the term of this patent is extended or adjusted under 35 U.S.C. 154(b) by 105 days.

(21) Appl. No.: 12/209,405

(22) Filed: Sep. 12, 2008

(65) Prior Publication Data

US 2010/0065028 A1    Mar. 18, 2010

(51) Int. Cl.
F02B 47/08 (2006.01)
F02B 47/00 (2006.01)

(52) U.S. Cl. .................. 123/568.17; 123/590

(58) Field of Classification Search ............ 123/568.17, 123/568.18, 568.11, 585, 586, 587, 590; 60/605.2; 701/108
See application file for complete search history.

(56) References Cited

U.S. PATENT DOCUMENTS

| | | | |
|---|---|---|---|
| 4,327,698 A | | 5/1982 | Hamai et al. |
| 4,329,843 A | | 5/1982 | Inoue et al. |
| 4,879,980 A | | 11/1989 | Piazzo |
| 4,993,227 A | | 2/1991 | Nagura et al. |
| 5,207,714 A | | 5/1993 | Hayashi et al. |
| 5,523,063 A | | 6/1996 | Anderson |
| 5,924,398 A | * | 7/1999 | Choi .................. 123/184.21 |
| 6,425,382 B1 | * | 7/2002 | Marthaler et al. ...... 123/568.17 |
| 6,470,867 B2 | | 10/2002 | Akiwa et al. |
| 6,513,506 B1 | | 2/2003 | Ito et al. |
| 6,672,296 B2 | | 1/2004 | Ito et al. |
| 6,776,146 B1 | | 8/2004 | Ricart-Ugaz et al. |
| 6,889,673 B2 | | 5/2005 | Bender et al. |
| 7,140,357 B2 | | 11/2006 | Wei et al. |
| 7,243,641 B2 | | 7/2007 | Zukouski |
| 7,363,761 B1 | | 4/2008 | Dickerson |
| 2002/0088443 A1 | | 7/2002 | Marthaler et al. |
| 2008/0149198 A1 | * | 6/2008 | Fuchinoue et al. ...... 137/561 A |

FOREIGN PATENT DOCUMENTS

JP    8284767    10/1996

OTHER PUBLICATIONS

Arnold, "Single Sequential Turbocharger: A New Boosting Concept for Ultra-Low Emission Diesel Engines," SAE Technical Paper Series, SAE International, Apr. 14-17, 2008 World Congress, Detroit, MI, USA.

* cited by examiner

*Primary Examiner*—Mahmoud Gimie
(74) *Attorney, Agent, or Firm*—Jerome R. Drouillard; Julia Voutyras

(57) ABSTRACT

An air inlet system for an internal combustion engine includes an inlet duct for furnishing air to the engine's cylinders, and a combination port formed within the inlet duct for inducting both recirculated exhaust gas and charge air into the engine. Mixing of the recirculated exhaust gas and the charge air is promoted by a flow director which is mounted at a downstream end of an EGR supply passage, as well as by a flow guide mounted upstream from the flow director, with the flow guide including an aerodynamic projection for causing charge air to move smoothly around the flow director and a swirl generator.

17 Claims, 5 Drawing Sheets

AIR INLET SYSTEM FOR AN INTERNAL COMBUSTION ENGINE

CROSS REFERENCE TO RELATED APPLICATIONS

None.

BACKGROUND OF THE INVENTION

1. Field of the Invention

This disclosure relates to an air inlet system for furnishing charge air, including recirculated exhaust gas, to the cylinders of a reciprocating internal combustion engine.

2. Related Art

Diesel engines, while offering excellent fuel economy, must be controlled ever more stringently in terms of exhaust emissions, particularly oxides of nitrogen ($NO_x$) and particulate matter. In an effort to control NOx without causing an undue loss in fuel economy, engine designers have relied upon increasingly higher amounts of exhaust gas recirculation (EGR). More specifically, EGR rates of approximately 30% at peak power conditions and 60% at low speed load are on the horizon. Unfortunately, it is difficult to furnish very high amounts of EGR to an engine's cylinders in a uniform manner; in other words, without providing too much EGR to one cylinder while too little to others. Maldistribution of EGR causes an engine to run rough and with unacceptable emissions. Although an extremely lengthy intake tract may be used to provide adequate mixing of EGR with the other components of charge air, a long intake tract may not be feasible, particularly in a vehicular application.

It would be desirable to provide an inlet system for an internal combustion engine, such as a diesel engine, having the capability of fully mixing large amounts of EGR in a charge air stream to prepare a uniform mixture for induction into the engine's power cylinders.

BRIEF DESCRIPTION OF THE INVENTION

According to an aspect of the present invention, an air inlet system for an internal combustion engine includes an inlet duct for furnishing air into the engine's cylinders, and a combination port, formed in the inlet duct, for inducting both recirculated exhaust gas and charge air into an engine. An EGR injector mounted within the combination port includes a central EGR supply passage extending generally parallel to the direction of charge air flow entering the combination port, and a flow director mounted at a downstream end of the EGR supply passage. The flow director and EGR supply passage cooperate to define an annular EGR discharge orifice.

According to another aspect of the present invention, a flow guide is mounted upstream from the flow director, with the flow guide including a generally ogive-shaped, aerodynamic projection for causing charge air to move smoothly around the flow director. The flow guide also includes a swirl generator with a number of radially directed vanes, with each of the vanes having at least a first end joined to the generally ogive-shaped projection and with the vanes adapted to impart a swirling motion to charge air, including EGR, flowing through the combination port.

According to another aspect of the present invention, the radially directed vanes of the swirl generator each have a first end joined to the generally ogive-shaped projection and a second end attached to a peripheral ring.

According to another aspect of the present invention, the flow director and the central EGR passage are configured to cause recirculated exhaust gas to enter the combination port radially.

According to another aspect of the present invention, the EGR supply passage may be equipped with an integral one-piece bulkhead having an ogive-shaped projection similar to the shape of the previously described flow guide, with the EGR supply passage also having a number of radially directed discharge orifices for causing EGR flow into a combination port in a radially directed direction.

It is an advantage of an air induction system according to the present invention that EGR will be introduced not only into the core portion of the air flowing into the engine, but also into the boundary, or more remote, portions of the flow, so as to promote an even distribution of EGR to the engine's cylinders.

It is another advantage of a system according to the present invention that pressure drop on both the EGR and charge air sides of the inducted gases will be reduced, as compared with known EGR systems, while allowing for both smaller package dimensions for the air induction system and excellent mixing of EGR gases with the charge air.

It is yet another advantage of a system according to the present invention that an engine equipped with this system may be optimized for minimum exhaust emissions because of the more finely regulated and even distribution of EGR to the engine's various cylinders.

It is yet another advantage of the present invention that, as a result of more even EGR flow to each cylinder, the cylinders will develop nearly identical peak pressures, permitting the engine to be calibrated at peak power to take maximum advantage of each cylinder instead of being restricted because of maldistribution in the cylinder pressures.

It is yet another advantage of a system according to the present invention that fuel economy will be improved because of the absence of a need to retard injection timing with a diesel engine to achieve mandated NOx levels.

It is yet another advantage of a system according to the present invention that the noise, vibration, and harshness (NVH) of an engine will be improved with the present system because even distribution of EGR will prevent discordant sounding combustion.

Other advantages, as well as features of the present invention, will become apparent to the reader of this specification.

DETAILED DESCRIPTION OF THE PREFERRED EMBODIMENTS

Figure 1:
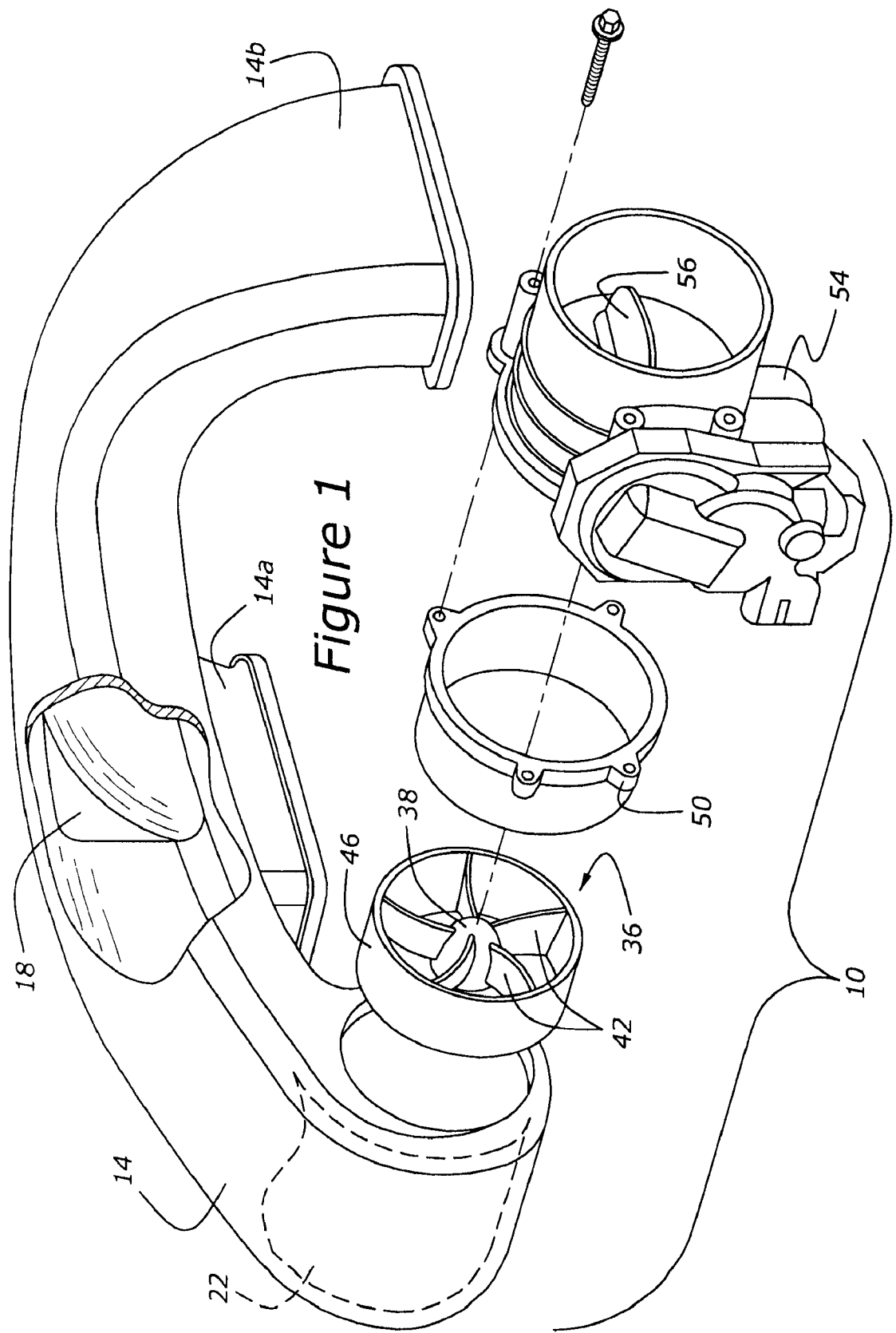
FIG. 1 is an exploded perspective view of a air inlet system according to an aspect of the present invention.

As shown in FIG. 1, air inlet system 10 includes an inlet duct, 14, having a dividing wall, 18, which separates duct 14 into bifurcated ducts 14a and 14b. Ducts 14a and 14b furnish air to different banks of a multi-bank reciprocating internal combustion engine. Those skilled in the art will appreciate, in view of this disclosure, however, that the present air inlet system may be employed with inline engines, in which case the bifurcation illustrated in inlet duct 14, including partial dividing wall 18, may be rendered unnecessary.

FIG. 1 shows with particularity throttle body 54, which may be either a manual or an electronically controlled throttle body, with the latter being illustrated. Throttle body 54 is attached to an adapter, 50, which functions to sandwich a flow guide 36 between throttle body 54 and combination port 22 of inlet duct 14. Throttle body 54 has a throttle valve, 56, shown in FIGS. 1, 5, and 6.

Figure 2:
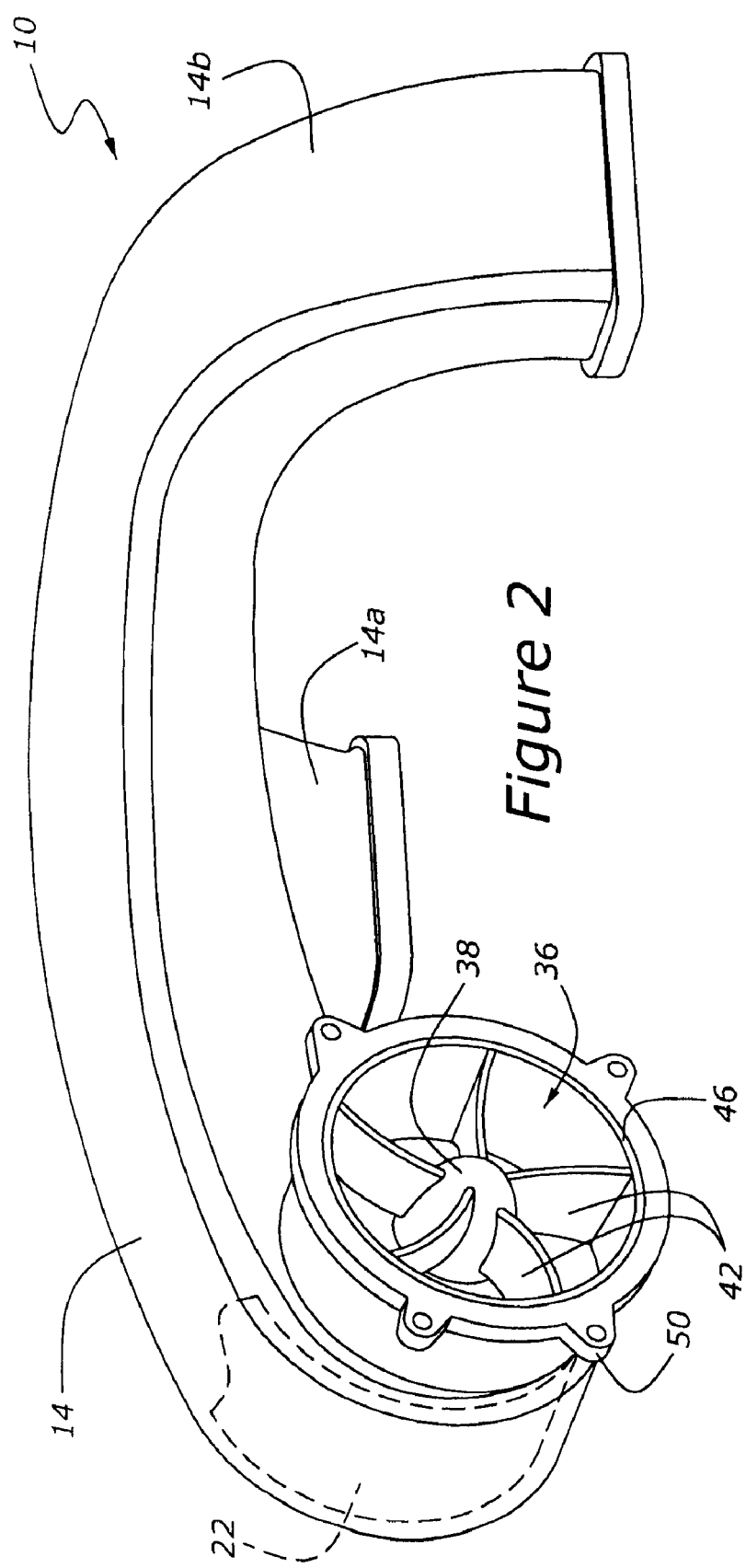
FIG. 2 illustrates a partially assembled air inlet system according to an aspect of the present invention.
Figure 5:
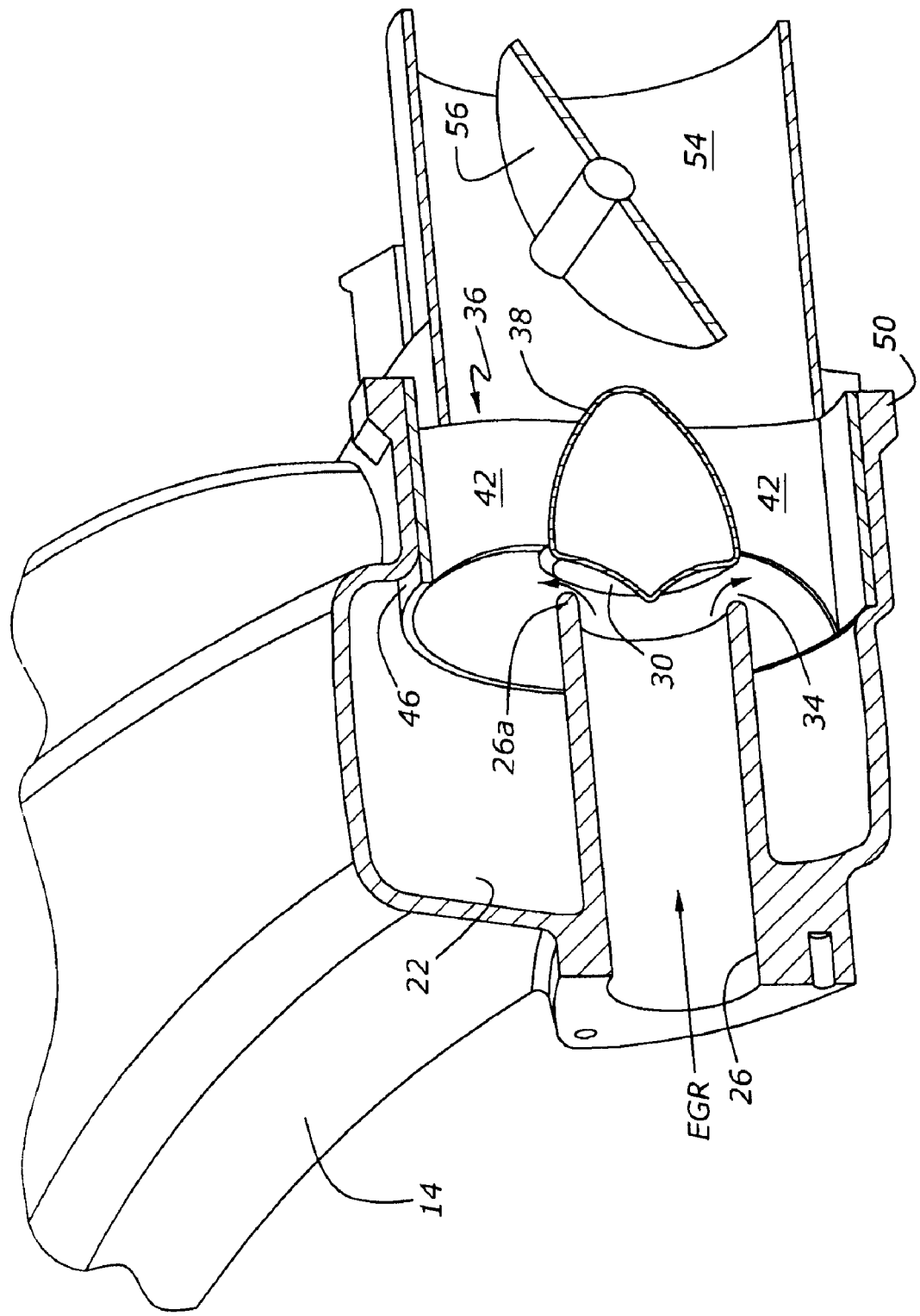
FIG. 5 is a perspective view of an air inlet system, according to the present invention, showing a combination of the EGR handling portion and a throttle body.

The precise mounting arrangement of flow guide 36 and adapter 50 are shown in FIG. 2, along with a perspective view of combination port 22. FIG. 5 illustrates further details of the placement of various components according to the present invention. Thus, combination port 22 is shown as being entered by an EGR injector including EGR supply passage 26, which extends in a direction generally parallel to charge air entering combination port 22. EGR supply passage 26 may be furnished with EGR controlled by an EGR valve in a manner known to those skilled in the art and suggested by this disclosure.

As shown in FIG. 5, downstream end 26a of EGR supply passage 26 cooperates with flow director 30 to define an annular EGR discharge orifice, 34, which is shown as allowing a radially directed flow of EGR into the charge air flowing through combination port 22. This radially directed flow of EGR assures even mixing of the EGR with the charge air, producing the benefits recited earlier in the specification.

Figure 3:
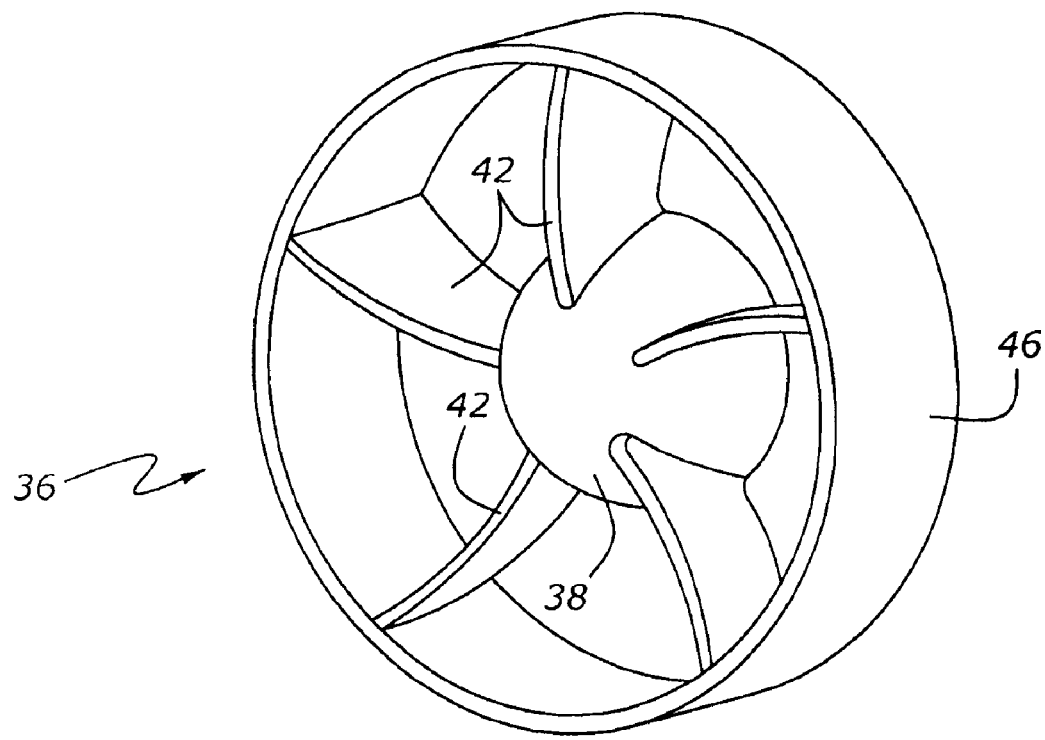
FIG. 3 illustrates a frontal perspective view of a flow guide according to an aspect of the present invention.
Figure 4:
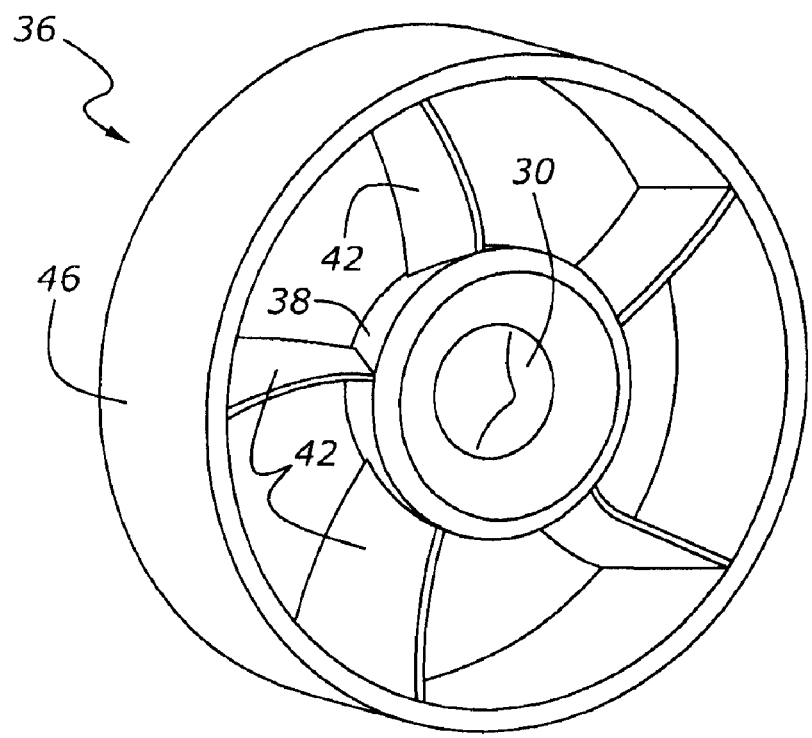
FIG. 4 is a perspective view of the flow guide of FIG. 3, but in a rear view.

As shown in FIGS. 3 and 4, flow director 30 is joined with and incorporated within flow guide 36, which includes an aerodynamic, generally ogive-shaped projection, 38, which causes charge air to flow smoothly around EGR supply passage 26, mitigating the pressure drop to which the charge air would otherwise be subjected. On the other hand, the smooth transition into annular orifice 34 provided by flow director 30 reduces the EGR pressure drop within EGR passage 26, thereby promoting the high EGR mass flow levels achievable by the present system.

Flow guide 36 also includes a number of swirl vanes, 42, with each of the vanes having a first end joined to generally ogive-shaped projection 38, and having a second end attached to a peripheral ring, 46, which facilitates the mounting of flow guide 36 into combination port 22, with the retention being provided by throttle body adapter 50. Although swirl vanes 42 provide excellent mixing, with certain applications having a sufficiently long mixing length, the vanes may not be required.

Figure 6:
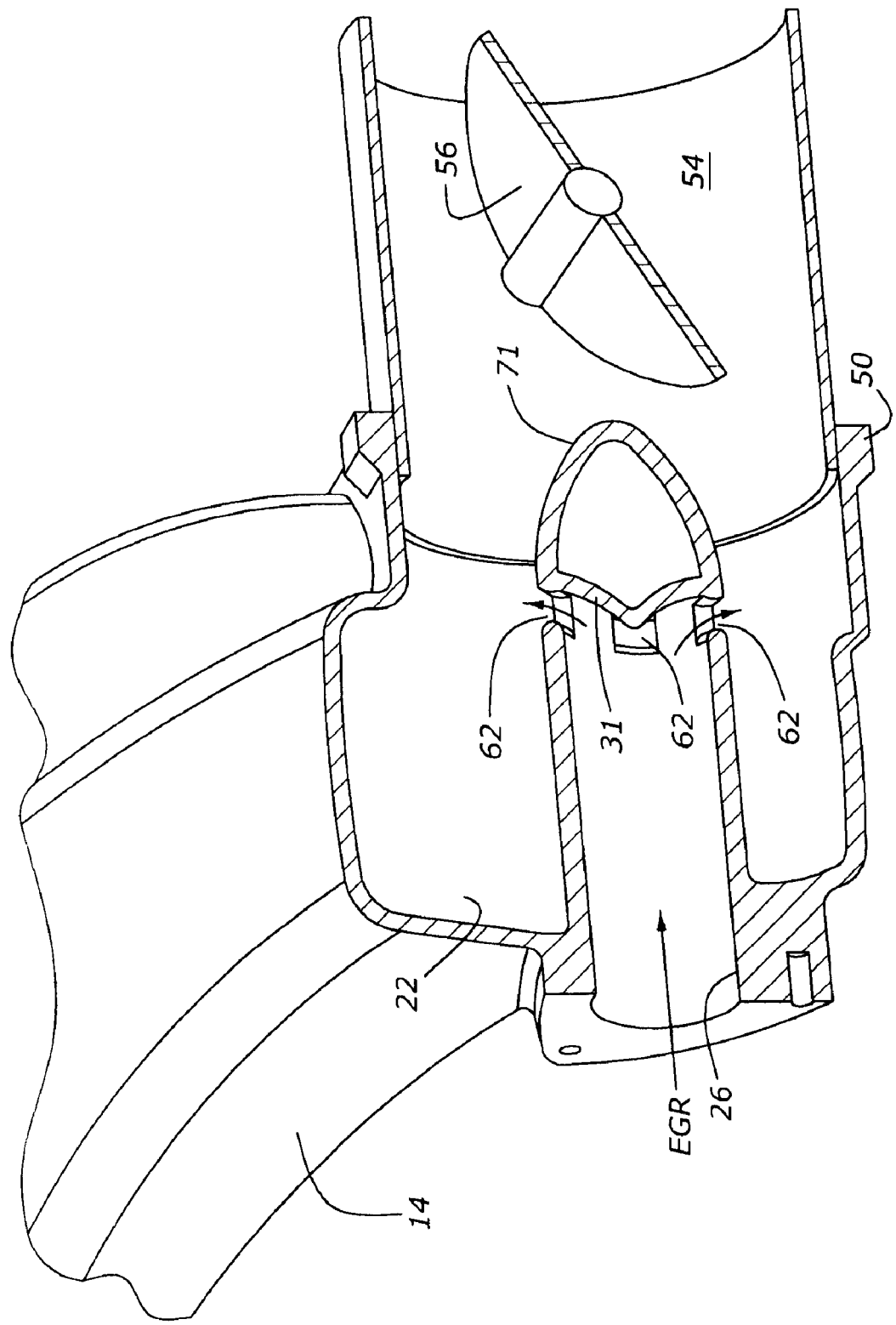
FIG. 6 is similar to FIG. 5, but shows a cantilevered EGR supply tube with a one-piece flow guide and a number of orifices for radial injection of EGR into charge air flowing from the throttle body.

In the event that inlet passage 14 may be configured with a longer mixing length for a particular engine, the configuration illustrated in FIG. 6 may be employed. In FIG. 6, EGR is discharged through a number of radially directed orifices 62, with EGR supply passage 26 having a unitary bulkhead, 31, surmounted by an ogive-shaped projection, 71, in the manner of projection 38. In the embodiment of FIG. 6, EGR supply passage 26 is cantilevered into generally cylindrical combination port 22 and extends axially and generally parallel to the direction of charge air flow. Because of the longer mixing length, swirl vanes 42 and peripheral ring 46 are eliminated.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. An air inlet system for an internal combustion engine, comprising:
    an inlet duct for furnishing charge air to engine cylinders;
    a combination port formed in said inlet duct for inducting both recirculated exhaust gas and charge air into an engine;
    an EGR injector mounted within said combination port, with said EGR injector comprising:
        a central EGR supply passage extending generally parallel to the direction of said charge air entering said combination port; and
        a flow director mounted at a downstream end of said EGR supply passage and, in combination with said EGR supply passage, defining an annular EGR discharge orifice; and
    a flow guide mounted upstream from said flow director, with said flow guide comprising:
        a generally ogive-shaped projection for causing charge air to move smoothly around said flow director; and
        a swirl generator comprising a plurality of radially directed vanes, with each of said vanes having at least a first end joined to said generally ogive-shaped projection, with said vanes adapted to impart a swirling motion to charge air flowing through said combination port.

2. An air inlet system according to claim 1, wherein said radially directed vanes of said swirl generator each comprise a first end joined to said generally ogive-shaped projection and a second end attached to a peripheral ring.

3. An air inlet system according to claim 1, further comprising a throttle body attached to said air inlet duct upstream from said flow guide.

4. An air inlet system according to claim 1, wherein said inlet duct is bifurcated downstream from said combination port.

5. An air inlet system according to claim 1, wherein said flow director, said generally ogive-shaped projection, and said swirl generator are one piece.

6. An air inlet system according to claim 1, wherein said flow director and said generally ogive-shaped projection are one piece.

7. An air inlet system according to claim 1, further comprising an electronically controlled throttle body attached to said air inlet duct immediately upstream from said flow guide.

8. An air inlet system according to claim 1, wherein said flow director and said central EGR passage are configured to cause recirculated exhaust gas to enter said combination port radially.

9. An air inlet system for an internal combustion engine, comprising:
    an inlet duct for furnishing charge air to engine cylinders;

a combination port formed in said inlet duct for inducting both recirculated exhaust gas and charge air into an engine;

an EGR injector mounted within said combination port, with said EGR injector comprising:

a central EGR supply passage extending generally parallel to the direction of said charge air flow through said combination port; and a flow director mounted at a downstream end of said EGR supply passage and, in combination with said EGR supply passage, defining an annular EGR discharge orifice, with said EGR supply passage and said flow director cooperating to cause recirculated exhaust gas to enter said combination port radially; and a flow guide formed as one piece with said flow director, with said flow guide being located upstream from said flow director, with said flow guide comprising:

an aerodynamic projection for causing charge air to move around said flow director; and a swirl generator comprising a plurality of radially directed vanes, with each of said vanes having a first end joined to said aerodynamic projection and a second end joined to a common peripheral ring, with said vanes adapted to impart a swirling motion to charge air flowing through said combination port.

10. An air inlet system for an internal combustion engine according to claim 9, wherein said one-piece flow director and flow guide are retained within said combination port by an adapter which is configured for mounting a throttle body.

11. An air inlet system for an internal combustion engine according to claim 10, further comprising a throttle body mounted to said adapter.

12. An air inlet system for an internal combustion engine according to claim 11, wherein said throttle body comprises an electronically controlled throttle body.

13. An air inlet system for an internal combustion engine according to claim 9, wherein said aerodynamic projection is generally ogive-shaped.

14. An air inlet system for an internal combustion engine, comprising:

an inlet duct for furnishing charge air to engine cylinders;

a combination port formed in said inlet duct for inducting both recirculated exhaust gas and charge air into an engine;

a one-piece EGR injector mounted within said combination port, with said EGR injector comprising:

a central EGR supply passage extending generally parallel to the direction of said charge air flow through said combination port; and an integral, unitary, flow director incorporated in a bulkhead mounted at a downstream end of said EGR supply passage and, in combination with said EGR supply passage, defining a plurality of EGR discharge orifices, with said orifices causing recirculated exhaust gas to enter said combination port radially; and a flow guide configured as one piece with said flow director, with said flow guide being located upstream from said flow director, with said flow guide comprising:

an aerodynamic projection for causing charge air to move around said flow director; and a swirl generator comprising a plurality of radially directed vanes, with each of said vanes having a first end joined to said aerodynamic projection and a second end joined to a common peripheral ring, with said vanes adapted to impart a swirling motion to charge air flowing through said combination port.

15. An air inlet system according to claim 14, wherein said aerodynamic projection is ogive-shaped.

16. An air inlet system for an internal combustion engine, comprising:

an inlet duct for furnishing charge air to engine cylinders;

a generally cylindrical combination port formed in said inlet duct for inducting both recirculated exhaust gas and charge air into an engine;

a one-piece EGR injector mounted within said combination port, with said EGR injector comprising:

a central EGR supply passage cantilevered axially into said combination port and extending generally parallel to the direction of said charge air flow through said combination port; and an integral, unitary, flow director incorporated in a bulkhead mounted at a downstream end of said EGR supply passage and, in combination with said EGR supply passage, defining a plurality of EGR discharge orifices, with said orifices causing recirculated exhaust gas to enter said combination port radially, with said flow director further comprising a generally ogive-shaped aerodynamic projection for causing charge air to move smoothly around said flow director.

17. An air inlet system according to claim 16, further comprising a flow guide configured as one piece with said flow director, with said flow guide being located upstream from said flow director, with said flow guide comprising a swirl generator comprising a plurality of radially directed vanes, with each of said vanes having a first end joined to said generally ogive-shaped projection and a second end joined to a common peripheral ring, with said vanes adapted to impart a swirling motion to charge air flowing through said combination port.

* * * * *